UNITED STATES PATENT OFFICE.

GEORGE H. EARP-THOMAS, OF RICHMOND, VIRGINIA.

FERTILIZER COMPOSITION AND PROCESS OF MAKING SAME.

14,686. Specification of Reissued Letters Patent. Reissued July 15, 1919.

No Drawing. Original No. 1,212,196, dated January 16, 1917, Serial No. 871,291, filed November 10, 1914. Renewed October 28, 1916, Serial No. 128,345. Application for reissue filed April 4, 1917. Serial No. 159,759.

*To all whom it may concern:*

Be it known that I, GEORGE H. EARP-THOMAS, formerly a citizen of New Zealand, but who have declared my intention of becoming a citizen of the United States, residing at Richmond, in the county of Henrico and State of Virginia, have invented certain new and useful Improvements in Fertilizer Compositions and Processes of Making Same, of which the following is a specification.

My invention relates to a new and useful improvement in a composition to be used as a fertilizer, a fertilizer filler, an artificial manure, or a carrier of beneficial soil bacteria; and the invention also relates to processes of making such compositions.

One of the principal ingredients of the composition, in a useful embodiment of the invention, is *Zostera marina*, or what is commonly known as eel grass.

It is of course understood that heretofore there has been little or no market for eel grass, so that the cost of the same is simply that of harvesting.

I have found that eel grass can be used with many minerals possessing fertilizing value to produce an excellent fertilizer, the eel grass, when carrying or inoculated with suitable bacteria as hereinafter described, acting as a decomposing agent by producing sufficient acid to decompose minerals, especially phosphate rock, and suitably taking the place of the expensive acidulating process to which this rock has heretofore been subjected for conversion into a commercial fertilizer.

For the production of a decomposing agent of the character described, eel grass may be very finely ground and mixed with decomposing bacteria in whose life process are developed products, that is, bacteria capable of effecting decomposition of mineral matter, such as ammonifying bacteria, nitrifying bacteria, nitrogen-fixing bacteria (all of which may be conveniently grouped under the generic term nitrogen bacteria or nitro-bacteria), and other bacteria. The material thus prepared and carrying selected bacteria of the desired character is then thoroughly mixed with raw finely ground rock phosphate upon which it exercises a converting action, analogous to the action of the acid added to raw phosphate rock in the usual acidulating process, the final product being a composition which contains phosphoric acid in a form available for plant food, and which is in a desirable condition to place in soil for nurturing crops. It will also be understood that it can be mixed with compounds containing patassium and nitrogen, and in suitable proportions to thereby form a complete fertilizer of any desired formula.

It will be understood that the greatest value of my invention is the mixing of the phosphate rock with the inoculated or bacteria-carrying organic material, such as eel grass to thereby decompose the phosphate rock, and in this manner doing away with the necessity of the acidulating process to which the rock is now subjected, the inoculated eel grass acting as a novel and suitable medium for converting the rock into a form in which it contains phosphoric acid in a useful and available condition. I also find a new use for humus, muck, or peat, which may be generically termed "humus material", which has a similar action to the eel grass. It can be used alone with the rock phosphate as a decomposing agent and as a food for bacteria, or it may be mixed with eel grass in varying proportions for the same purpose. The eel grass has the advantage in this mixture of adding a large percentage of compounds of potassium, sodium and some other elements which possess fertilizing value so that the peat is more readily acted upon by the bacteria. It will be understood that the proportions vary and a mixture of fifty per cent. of the eel grass and phosphate rock have been found very suitable, or a mixture of muck and eel grass and phosphate rock may be made.

The term "muck" is employed herein in a broad sense, but a typical material properly coming within this term for the purposes of the invention is swamp or bog soil rich in decayed vegetable material.

Having thus described my invention what I claim and desire to secure by Letters Patent is:—

1. The process of preparing fertilizer material which comprises grinding eel grass, inoculating it with suitable decomposing bacteria, grinding phosphate rock, and mixing the inoculated eel grass therewith.

2. The process of preparing fertilizer material which comprises grinding eel grass, mixing humus material therewith, inoculating the mixture with suitable nitro-bacteria, grinding phosphate rock and mixing the inoculated mixture therewith.

3. A fertilizer comprising humus material and eel grass both inoculated with suitable decomposing bacteria, all mixed with rock phosphate and with added compounds containing potassium and nitrogen.

4. A fertilizer comprising eel grass inoculated with suitable decomposing bacteria, mixed with rock phosphate and compounds containing potassium and nitrogen.

5. A fertilizer comprising ground eel grass inoculated with suitable nitro-bacteria, mixed with ground phosphate rock.

6. The process of preparing fertilizer material which comprises commingling suitable organic matter, nitro-bacteria beneficial to soil, and a mineral containing plant food in unavailable form.

7. The process of treating mineral matter containing fertilizing values for the production of fertilizer material which comprises subjecting such mineral matter to the action of selected nitro-bacteria, beneficial to soil.

8. The process of treating mineral matter containing fertilizing values for the production of a fertilizer which comprises mixing with such mineral matter a nutrient material carrying ammonifying, nitrifying, and nitrogen-fixing bacteria, and thereby rendering available plant food contained in said mineral matter.

9. The process of treating a phosphatic mineral for the production of a fertilizer material which comprises subjecting such mineral to the decomposing action of selected nitro-bacteria, beneficial to soil, in the presence of a food for said bacteria.

10. The process of treating raw phosphate rock for the production of a fertilizer material which comprises mixing with such rock in finely divided condition, organic matter and selected nitro-bacteria, beneficial to soil.

11. The process of treating raw phosphate rock for fertilizer purposes which comprises mixing finely divided phosphate rock with material carrying ammonifying, nitrifying, and nitrogen-fixing bacteria and containing food for said bacteria, and thereby rendering available phosphoric acid contained in said rock.

12. A fertilizer comprising finely divided phosphate rock mixed with selected nitro-bacteria and organic food material for bacteria.

13. A fertilizer comprising finely divided phosphate rock in intimate mixture with a humus-providing material and nitrifying bacteria.

14. A fertilizer comprising humus providing material in intimate mixture with finely divided phosphate rock and selected nitro-bacteria.

15. A fertilizer comprising suitable organic matter in intimate mixture with selected nitro-bacteria and a finely divided mineral containing a constituent valuable as plant food.

16. The process of treating minerals to render available plant food contained therein which comprises subjecting such a mineral to the decomposing action of selected acid-producing bacteria in active condition.

17. The process of preparing a fertilizer which comprises subjecting phosphate rock to the decomposing action of acid-producing bacteria in active condition.

In testimony whereof I affix my signature in the presence of two witnesses.

GEORGE H. EARP-THOMAS.

Witnesses:
NATHAN RUSSELL,
LEONARD BEASLEY.